(12) United States Patent
Meaney et al.

(10) Patent No.: US 7,937,203 B2
(45) Date of Patent: May 3, 2011

(54) CONTROL SYSTEM RESPONSIVE TO RELATION BETWEEN FRICTION COEFFICIENT AND WHEEL ROTATIONAL SPEED FOR A WHEEL

(75) Inventors: Paul Meaney, Berkhamsted (GB); Simon Le Floc'h, Grenoble (FR); Peter Frijlink, Gothenburg (SE)

(73) Assignee: AB SKF, Göteborg (SE)

( * ) Notice: Subject to any disclaimer, the term of this patent is extended or adjusted under 35 U.S.C. 154(b) by 810 days.

(21) Appl. No.: 11/720,669

(22) PCT Filed: Dec. 5, 2005

(86) PCT No.: PCT/NL2005/000832
§ 371 (c)(1),
(2), (4) Date: Dec. 12, 2007

(87) PCT Pub. No.: WO2006/059905
PCT Pub. Date: Jun. 8, 2006

(65) Prior Publication Data
US 2008/0195291 A1    Aug. 14, 2008

(30) Foreign Application Priority Data

Dec. 3, 2004 (NL) .................................... 1027648

(51) Int. Cl.
*G06F 17/00* (2006.01)
(52) U.S. Cl. .......................................... 701/74; 701/82
(58) Field of Classification Search .................. 701/70, 701/71, 73, 74, 75, 78, 79, 80, 82, 83, 90
See application file for complete search history.

(56) References Cited

U.S. PATENT DOCUMENTS

| | | | | |
|---|---|---|---|---|
| 3,880,474 A | * | 4/1975 | Scharlack | 303/156 |
| 4,043,608 A | * | 8/1977 | Bourg et al. | 303/167 |
| 4,671,579 A | * | 6/1987 | Sawano et al. | 303/150 |
| 4,773,013 A | * | 9/1988 | Crapanzano et al. | 701/79 |
| 4,947,328 A | * | 8/1990 | Sugasawa | 701/42 |
| 5,163,530 A | * | 11/1992 | Nakamura et al. | 180/197 |
| 5,471,390 A | * | 11/1995 | Sasaki | 701/78 |
| 5,948,961 A | * | 9/1999 | Asano et al. | 73/9 |
| 6,122,585 A | * | 9/2000 | Ono et al. | 701/71 |
| 6,316,904 B1 | * | 11/2001 | Semenov et al. | 318/727 |
| 6,754,615 B1 | * | 6/2004 | Germann et al. | 703/8 |
| 2005/0090943 A1 | * | 4/2005 | Kogure et al. | 701/1 |
| 2006/0080021 A1 | * | 4/2006 | Park et al. | 701/71 |
| 2007/0038340 A1 | * | 2/2007 | Sekiguchi et al. | 701/22 |

FOREIGN PATENT DOCUMENTS

| | | |
|---|---|---|
| DE | 10160049 | 7/2002 |
| DE | 10208815 | 9/2003 |
| DE | 10325182 | 12/2004 |

* cited by examiner

OTHER PUBLICATIONS

International Bureau, International Search Report, International Application No. PCT/NL2005/000832, Jun. 3, 2006.

*Primary Examiner* — Thomas G Black
*Assistant Examiner* — Sze-Hon Kong
(74) *Attorney, Agent, or Firm* — Vedder Price P.C.

(57) ABSTRACT

The invention relates to a control system for a vehicle with wheels, where at least one wheel is connected with means for braking and/or driving the wheel, the control system comprising a measuring device to measure a rotational speed of the wheel, a longitudinal force and a vertical force that occur at the wheel-road contact, and a control unit connected to the measuring device, to control the braking and/or driving of the wheel. The system is equipped to determine the second derivative (SD) of the wheel speed to the quotient of the longitudinal force and the vertical force and use this parameter to control the braking and/or driving the wheel.

5 Claims, 2 Drawing Sheets

Figure 1:
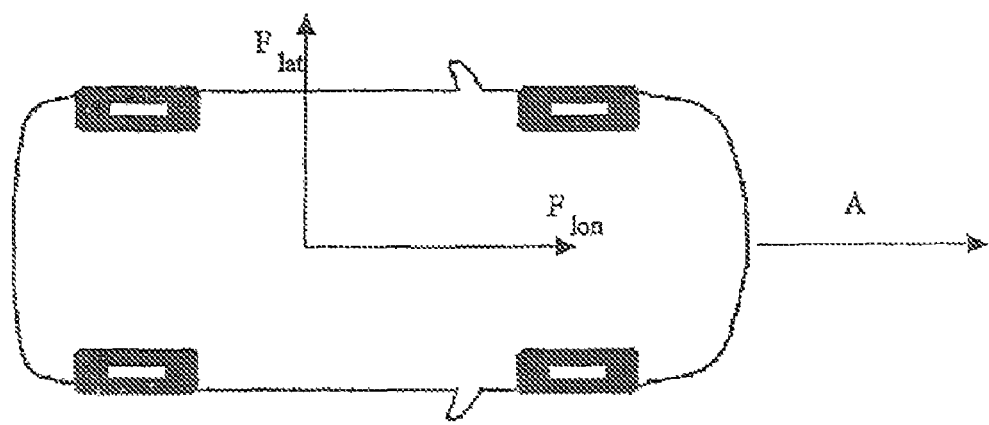

CONTROL SYSTEM RESPONSIVE TO RELATION BETWEEN FRICTION COEFFICIENT AND WHEEL ROTATIONAL SPEED FOR A WHEEL

The invention relates to a control system for the braking and/or the driving of a wheel, and more specifically to a control system for a vehicle with wheels, where at least one wheel is connected with means for braking and/or driving the wheel, the control system comprising a measuring device to measure a rotational speed of the wheel, a longitudinal force and a vertical force that occur at the wheel-road contact, and a control unit connected to the measuring device, to control the braking and/or driving of the wheel.

Control systems for vehicles with wheels have been known for some time, e.g. in Anti Blocking Systems (ABS) for brakes. The known devices measures the wheel speed on the wheels that are equipped with a brake. If the speed of a wheel deviates (strongly) from the speed of the other wheels, or if the wheel speed of a wheel decreases sharply, then that wheel is suspected to slip or about to slip and the pressure on the brake of that wheel is released.

This way of controlling the brakes has the disadvantage that the effect that needs to be avoided is actually used as a measuring variable which controls the brakes, i.e. feed back is given to the brake when complete blocking or at least partial blocking occurs.

German Patent Application DE 101 60 049 A describes a system to monitor the driving behaviour of a motor vehicle. From a wheel of the vehicle various measurements are taken, from which measurements wheel speed and forces acting in the wheel-road contact are determined. The measurements are compared with a set of predefined and recorded characteristics that represent a certain driving condition, like summer tires on a dry surface, winter tires on a wet surface, winter tires on snow, etc. This has the disadvantage that just a limited number of characteristics can be recorded and so the chances that a selected characteristic is in agreement with reality is also limited. Also if a reasonable variety of conditions is recorded, then it takes many comparisons to be made before a control action can be determined for a vehicle control system, such as ABS, traction control system (TCS), electronic stability program (ESP), adaptive cruise control (ACC), etc.

It is an aim of the present invention to provide a control system for a vehicle with wheels, where at least one wheel is connected with means for braking and/or driving the wheel, the control system comprising a measuring device to measure a rotational speed ($\omega$) of the wheel, a longitudinal force ($F_{lon}$) and a vertical, force ($F_{vert}$) that occur at the wheel (10)-road (20) contact, and a control unit connected to the measuring device, to control the braking and/or driving of the wheel, that is able to detect imminent blocking or spinning of the wheel in a fast and reliable way, independent of road and tire characteristics.

The aim is being reached with an Anti Blocking System according to claim 1.

The control of the ABS of the brake or of the drive system of the wheel is performed by using the second derivative (SD) of the wheel speed, to the quotient of the longitudinal force and the vertical force at the tire-road contact as a control parameter. During normal braking this parameter is basically zero. At the onset of blocking or spinning this parameter will get a value different from zero and will increase in magnitude rapidly. This indicator is independent of the road and tire characteristics and can very easily and rapidly be determined.

In a preferred embodiment of the invention, when this parameter exceeds a predetermined threshold, the control unit reduces the braking and/or driving of the wheel with a predetermined amount. When then the control unit reduces the braking and/or driving of the wheel with a predetermined amount, blocking or spinning of the wheel can then be avoided to occur.

A control system as described above can with advantage be used as a control system for an anti blocking system (ABS), a traction control system (TCS), an electronic stability program (ESP), an adaptive cruise control (ACC), or a combination of those. All these systems require, the functionality described above and provided by the system according to the invention.

A further advantage is obtained when, in addition to this first control parameter the first derivative (FD) of the quotient of the longitudinal force and the vertical force to the wheel speed is used as a control parameter. This parameter can be used to detect abrupt changes of the friction coefficient of the road. During normal braking, when the wheel is coming from a dry road to an icy road, this parameter drops to negative values under a predefined threshold value, indicating that the road friction has brutally dropped. Detection of such a condition is enhancing the control system according to the invention further.

In a preferred embodiment of the invention, when this first derivative falls below a predetermined negative threshold, the control unit reduces the braking and/or driving of the wheel with a predetermined amount. When then the control unit reduces the braking and/or driving of the wheel with a predetermined amount, blocking or spinning of the wheel can then be avoided to occur, also when sudden changes in the road condition occur, such as coming from a dry road to an icy patch of the road.

Figure 2:
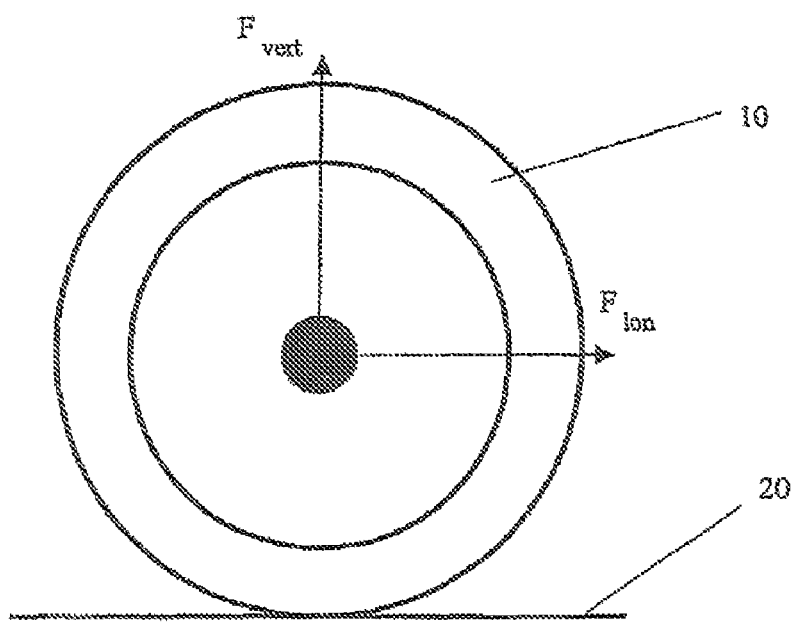
Figure 3:
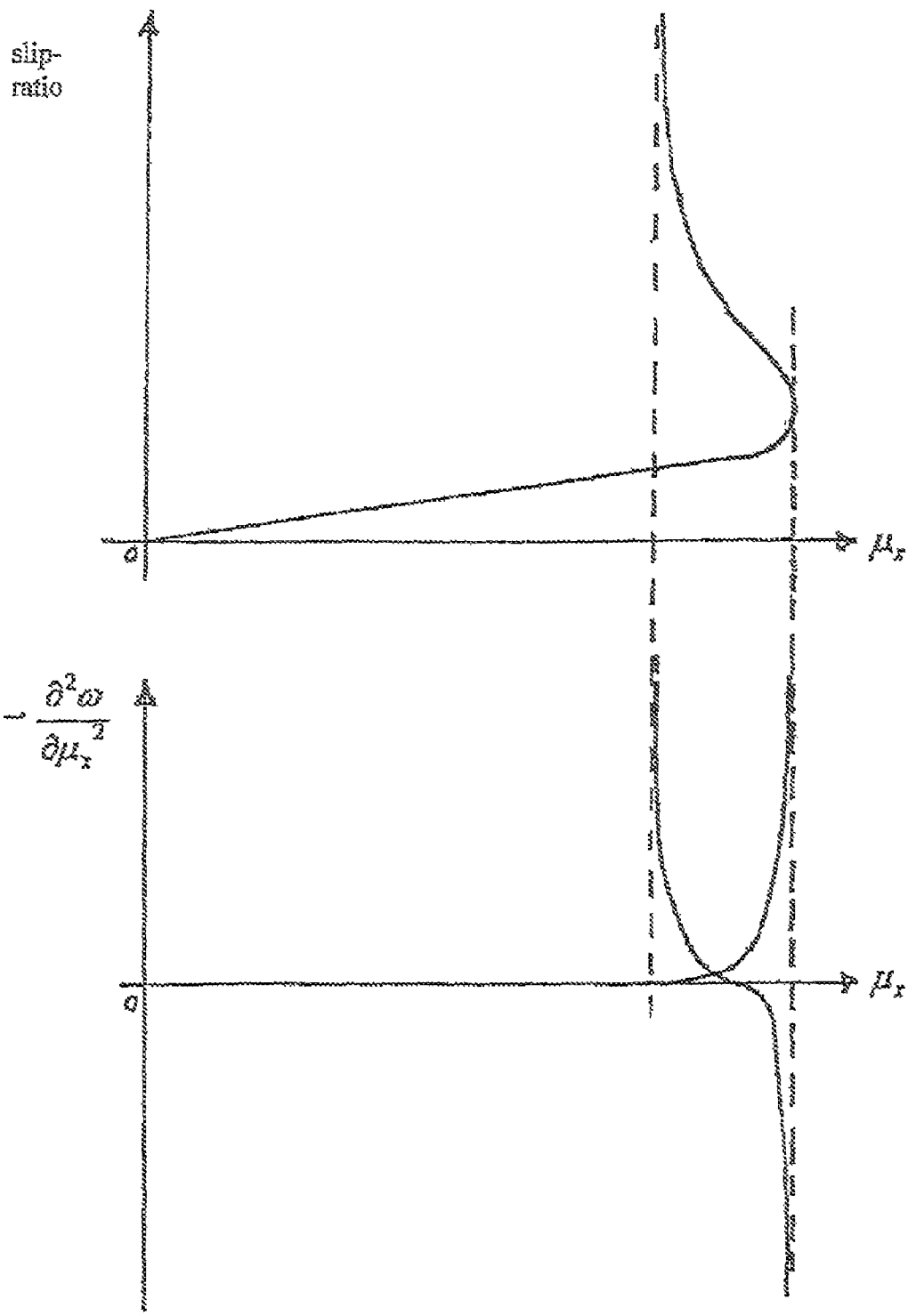

The invention will now be further explained by describing a preferred embodiment, referring to the drawing, in which FIG. 1 shows schematically a top view of an example of a vehicle, FIG. 2 shows a side view of a wheel of the vehicle of FIG. 1 in contact with a road, FIG. 3 shows a diagram of coefficient of friction versus slip-ratio and a control parameter according to the invention.

FIGS. 1 and 2 serve to illustrate the directions of the forces and their corresponding names as they are used in this document. FIG. 1 shows a schematic example of a vehicle, in this case a car with four wheels. The direction of straight ahead driving is indicated with the arrow A, in front of the car. Near the centre of the car two forces are drawn, a longitudinal force $F_{lon}$ and a lateral force $F_{lat}$. In FIG. 2 a wheel 10 is shown in contact with road 20. At the wheel road contact again two forces are drawn, the longitudinal force $F_{lon}$ in the driving direction, which in this case is an accelerating force, since it is in the direction of arrow A of FIG. 1. If it would have been in the opposite direction it would have been a braking force, and the vertical force $F_{vert}$.

A car, such as shown in FIG. 1 is equipped with brakes at its four wheels and the brakes are controlled by ABS. In addition to a measuring device for the measurement of the wheel speed, the car is also equipped with a second measuring device to measure at each wheel a longitudinal force $F_{lon}$ that occurs at the wheel-road contact. This second measuring device also measures the vertical force $F_{vert}$ that occurs at the wheel road contact. These forces are for one wheel indicated in FIG. 2.

Referring to FIG. 3, the top part hereof shows a relation between a slip ratio and the coefficient of friction, in the graph indicated as $\mu_x$. The slip ratio is defined as, 1 minus the ratio between the speed of the wheel concerned to the speed of the centre of gravity of the car. The relationship of the top part of FIG. 3 illustrates what happens if a wheel is braked with increasing pressure on the brake until the wheel starts to slip, without interference from the ABS. It illustrates that with increasing pressure on the brake, the breaking force will increase, and hence the friction coefficient $\mu_x$. In this stage the slip ratio will increase slowly, starting from zero. When the slip ratio starts to increases more strongly, then the wheel starts to slip and the coefficient of friction decreases.

With an ABS according to the invention, the ABS controls the pressure on the brake such, that the peak point value of the friction coefficient $\mu_x$ is not passed.

Referring now to the bottom part of FIG. 3, this part shows a relation between the friction coefficient $\mu_x$ and the second derivative (SD) of the wheel speed ω to the quotient, of the longitudinal force, $F_{lon}$, and the vertical force, $F_{vert}$, at the tire 10 road 20 contact. The friction coefficient $\mu_x$ in the top part of FIG. 3 is identical to the friction coefficient $\mu_x$ in the bottom part of FIG. 3. The ABS of this embodiment of the invention utilizes the second derivative (SD) of the wheel speed to the quotient of the longitudinal force, $F_{lon}$, and the vertical force, $F_{vert}$, at the tire 10 road 20 contact as a control parameter. As can be seen from the bottom part of FIG. 3, this control parameter remains zero until the friction coefficient $\mu_x$ gets very close to its maximum. Then this parameter gets in absolute value positive and rises sharply, until the friction coefficient $\mu_x$ reaches its maximum. In the basically instable area beyond the maximum of the friction coefficient $\mu_x$ the control parameter quickly changes from a very large positive value ('infinity') to a very large negative value ('minus infinity').

When this control parameter gets a value other than zero, this gives a clear indication that the wheel is close to blocking. By limiting the control parameter to a maximum threshold value, it is possible to keep $\mu_x$ very close to its maximum and thus ensure the maximum braking capacity, without going to the state of the wheel getting blocked.

The invention claimed is:

1. A control system for a vehicle with wheels, where at least one wheel is connected with means for braking and/or driving the wheel, the control system comprising a measuring device to measure a rotational speed of the wheel, a longitudinal force and a vertical force that occur at the wheel road contact, and a control unit connected to the measuring device, to control the braking and/or driving of the wheel, said system being equipped to determine the second derivative of the wheel speed to the quotient of the longitudinal force and the vertical force and using this parameter to control the braking and/or driving the wheel.

2. A control system according to claim 1, arranged so that if the second derivative exceeds a predetermined threshold, the control unit will reduce the braking and/or driving force to the wheel by a predetermined amount.

3. A control system according to claim 1, arranged so that said control system is one selected from a group consisting of an anti blocking system, a traction control system, an electronic stability program, an adaptive cruise control, and a combination of those.

4. A control system according to claim 1, wherein the control system is equipped to determine the first derivative of the quotient of the longitudinal force and the vertical force to the wheel speed and uses this parameter to control the braking and/or driving the wheel.

5. A control system according to claim 4, which, if the first derivative falls below a predetermined negative threshold, the control unit reduces the braking and/or driving of the wheel by a predetermined amount.

* * * * *